(12) United States Patent
Washiyama

(10) Patent No.: US 7,711,020 B2
(45) Date of Patent: May 4, 2010

(54) OPTICAL PICK-UP APPARATUS AND OPTICAL DISK APPARATUS

(75) Inventor: Toru Washiyama, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 964 days.

(21) Appl. No.: 11/318,684

(22) Filed: Dec. 28, 2005

(65) Prior Publication Data

US 2006/0139761 A1  Jun. 29, 2006

(30) Foreign Application Priority Data

Dec. 28, 2004  (JP) .............................. 2004-381934
Oct. 3, 2005  (JP) .............................. 2005-289907

(51) Int. Cl.
  *H01S 3/04*  (2006.01)
(52) U.S. Cl. .......................................... 372/36; 372/34
(58) Field of Classification Search ................. 372/34, 372/36; 720/671; 359/641, 719
  See application file for complete search history.

(56) References Cited

U.S. PATENT DOCUMENTS

| 6,381,207 | B1 | 4/2002 | Ryoo et al. |
| 6,831,882 | B1 | 12/2004 | Takashima et al. |
| 6,871,351 | B2 * | 3/2005 | Yamauchi et al. ........... 720/671 |
| 2005/0094694 | A1 * | 5/2005 | Fujihara et al. ............. 372/43 |

FOREIGN PATENT DOCUMENTS

| CN | 1339156 A | 3/2002 |
| CN | 1160714 C | 8/2004 |
| EP | 1 148 482 A1 | 10/2001 |
| JP | 5-166219 | 7/1993 |
| JP | 8-249699 | 9/1996 |
| JP | 10-233028 | 9/1998 |
| JP | 11-353675 | 12/1999 |
| JP | 2000-242953 | 9/2000 |
| JP | 2002-280656 | 9/2002 |
| JP | 2002-319167 A | 10/2002 |
| JP | 2003-173558 | 6/2003 |
| JP | 2004-178749 | 6/2004 |
| JP | 2004-239961 | 8/2004 |
| JP | 2004-241032 | 8/2004 |
| JP | 2005-322299 | 11/2005 |

* cited by examiner

*Primary Examiner*—Jack Dinh
(74) *Attorney, Agent, or Firm*—Oblon, Spivak, McClelland, Maier & Neustadt, L.L.P.

(57) ABSTRACT

An exemplary optical pick-up apparatus of the invention comprises: an optical base; a collimator lens provided on the optical base; a laser source disposed adjacent the collimator lens on the optical base and emitting light that produces heat; and temperature gradient control means, provided between the collimator lens and the laser source on the optical base, for flattening temperature gradient between the collimator lens and its surroundings.

3 Claims, 3 Drawing Sheets

OPTICAL PICK-UP APPARATUS AND OPTICAL DISK APPARATUS

CROSS-REFERENCE TO RELATED APPLICATIONS

This application is based upon and claims the benefits of priority from the prior Japanese Patent Application No. 2004-381934 filed Dec. 28, 2004, and Japanese Patent Application No. 2005-289907, filed Oct. 3, 2005, the contents of both of which are hereby incorporated by reference in their entirety.

BACKGROUND OF THE INVENTION

1. Field of the Invention

The present invention relates to an optical pick-up apparatus, and particularly to an optical pick-up apparatus having a plurality of semiconductor laser sources, etc., and to the structure of an optical disk apparatus.

2. Description of the Related Art

When a spherical lens is used as an optical pick-up collimator lens, two or three lenses are needed, however, when a non-spherical lens is used instead, only one lens is needed. Further, since resin is now shown to have properties suitable for formation of a lens, a non-spherical lens made of resin is now commonly used for a collimator lens, thereby allowing the suppliers' optical products to meet their need for reduction in size, weight, and cost of the products.

However, it has been shown that the temperature difference between a lens and its surroundings produces a temperature gradient across the lens and then causes lens distortion, and in general, the lens distortion of a lens made of resin is greater than that of a lens made of glass. For example, heat from a heat source provided on an optical base causes significant distortion in a collimator lens and such distortion leads to a problematic situation where recording or reproduction of information on or from a recording medium is not normally performed.

Generally, if it is possible to give wider spacing between a collimator lens and a heat source on an optical base or provide an optical base with the ability to efficiently dissipate heat, the problem associated with the heat generation arising as described above is not so serious. However, in a compact and thin optical pick-up apparatus intended to be incorporated into a notebook personal computer (PC), it is difficult to give wider spacing between a collimator lens and a heat source on an optical base or provide an optical base with the ability to efficiently dissipate heat. Further, in an optical pick-up apparatus comprising CD, DVD, HD-DVD laser diodes which emit light beams of three different wavelengths, the number of heat sources increases and space available for optical components is limited, and therefore, the conditions of heat dissipation, which are preferred as described above, are more difficult to be satisfied.

[Patent Document 1]

Japanese Patent Unexamined Publication No. 2004-133963

[Patent Document 1]

Japanese Patent Unexamined Publication No. 2003-45059

[Patent Document 1]

Japanese Patent Unexamined Publication No. 2002-319167

SUMMARY OF THE INVENTION

Heat dissipation methods have been disclosed in Patent document 1 (Japanese Patent Unexamined Publication No. 2004-133963), Patent document 2 (Japanese Patent Unexamined Publication No. 2003-45059), and Patent document 3 (Japanese Patent Unexamined Publication No. 2002-319167). However, the above methods are not necessarily useful in preventing distortion of a collimator lens in an optical pick-up apparatus to which the present invention is directed and in which a number of heat sources are provided.

The present invention is intended to solve heat transfer problem which is found in the above-described conventional compact optical pick-up apparatus having a number of heat sources and an object of the invention is to provide a compact optical pick-up apparatus capable of flattening temperature gradient between a collimator lens and its surroundings on an optical base in order to reduce distortion of the collimator lens, and to provide an optical disk apparatus incorporating the optical pick-up apparatus.

According to the first aspect of the invention, there is provided an optical pick-up apparatus comprising: an optical base; a collimator lens provided on the optical base; a laser source disposed adjacent the collimator lens on the optical base and emitting light that produces heat; and temperature gradient control means, provided between the collimator lens and the laser source on the optical base, for flattening temperature gradient between the collimator lens and its surroundings.

According to the first aspect of the invention, providing the temperature gradient control means, which is present between the collimator lens and the laser source on the optical base, in order to flatten temperature gradient between the collimator lens and its surroundings greatly reduces the thermal influence of the laser source on the collimator lens and prevents distortion of the collimator lens.

According to the second aspect of the invention, the optical pick-up apparatus constructed in accordance with the first aspect of the invention is characterized in that the temperature gradient control means is a first high heat resistivity member. According to the second aspect of the invention, the first high heat resistivity member provided between the collimator lens and the laser source serves to greatly reduce the thermal influence of the laser source on the collimator lens and prevent distortion of the collimator lens.

According to the third aspect of the invention, the optical pick-up apparatus constructed in accordance with the second aspect of the invention is characterized in that the first high heat resistivity member is a penetration hole formed in the optical base. According to the third aspect of the invention, the penetration hole serves to greatly reduce the thermal influence of the laser source on the collimator lens and prevent distortion of the collimator lens.

According to the fourth aspect of the invention, the optical pick-up apparatus constructed in accordance with the third aspect of the invention further comprises heat shielding means mounted to the optical base and including a second high heat resistivity member and a space, in which the heat source, i.e., the laser source emitting light that produces heat is attached to the second high heat resistivity member and disposed in the space, and the heat shielding means inhibits heat transfer between the optical base and the laser source. According to the fourth aspect of the invention, the heat shielding means including the second high heat resistivity member carrying the laser source, which is to be fixed to the optical base via the high heat resistivity member, and the space provided on the optical base and housing the laser source serves to inhibit heat transfer between the optical base and the laser source and thereby greatly reduce the thermal influence of the laser source on the collimator lens and prevent distortion of the collimator lens.

According to the fifth aspect of the invention, there is provided an optical pick-up apparatus comprising: an optical base; a collimator lens provided on the optical base; a laser source disposed adjacent the collimator lens on the optical base and emitting light that produces heat; and temperature gradient control means, disposed opposite the collimator lens with respect to the laser source on the optical base, for flattening temperature gradient between the collimator lens and its surroundings. According to the fifth aspect of the invention, disposing the temperature gradient control means opposite the collimator lens with respect to the laser source on the optical base to allow temperature gradient between the collimator lens and its surroundings to be flattened greatly reduces the thermal influence of the laser source on the collimator lens and prevents distortion of the collimator lens.

According to the sixth aspect of the invention, the optical pick-up apparatus constructed in accordance with the fifth aspect of the invention is characterized in that the temperature gradient control means is a low heat resistivity member. According to the sixth aspect of the invention, the low heat resistivity member dissipates heat from the laser source and serves to greatly reduce the thermal influence of the laser source on the collimator lens and thereby prevent distortion of the collimator lens.

According to the seventh aspect of the invention, the optical pick-up apparatus constructed in accordance with the sixth aspect of the invention is characterized in that the low heat resistivity member is a heat dissipation member. According to the seventh aspect of the invention, the heat dissipation member dissipates heat from the laser source and serves to greatly reduce the thermal influence of the laser source on the collimator lens and thereby prevent distortion of the collimator lens.

According to the eighth aspect of the invention, the optical pick-up apparatus according to seventh aspect, further comprising heat shielding means including a second high heat resistivity member mounted to the optical base and a space, wherein the laser source is disposed in the space, and the heat shielding means inhibits heat transfer between the optical base and the laser source. According to the eighth aspect of the invention, the heat shielding means including the high heat resistivity member carrying the laser source, which is to be fixed to the optical base via the high heat resistivity member, and the space provided on the optical base and housing the laser source serves to inhibit heat transfer between the optical base and the laser source and thereby greatly reduce the thermal influence of the laser source on the collimator lens and prevent distortion of the collimator lens.

According to the ninth aspect of the invention, there is provided an optical pick-up apparatus comprising: an optical base; a collimator lens provided on the optical base; a laser source disposed adjacent the collimator lens on the optical base and emitting light that produces heat; first temperature gradient control means, provided between the collimator lens and the laser source on the optical base, for flattening temperature gradient between the collimator lens and its surroundings; and second temperature gradient control means, disposed opposite the collimator lens with respect to the laser source on the optical base, for flattening temperature gradient between the collimator lens and its surroundings. According to the ninth aspect of the invention, the first temperature gradient control means provided between the collimator lens and the laser source, and the second temperature gradient control means disposed opposite the collimator lens with respect to the laser source work together to greatly reduce the thermal influence of the laser source on the collimator lens and prevent distortion of the collimator lens.

According to the tenth aspect of the invention, the optical pick-up apparatus constructed in accordance with the ninth aspect of the invention is characterized in that the first temperature gradient control means is a high heat resistivity member and the second temperature gradient control means is a low heat resistivity member. According to the tenth aspect of the invention, the high heat resistivity member inhibiting heat transfer from the laser source and the low heat resistivity member dissipating heat from the laser source work together to greatly reduce the thermal influence of the laser source on the collimator lens and prevent distortion of the collimator lens.

According to the eleventh aspect of the invention, the optical pick-up apparatus constructed in accordance with the tenth aspect of the invention is characterized in that the high heat resistivity member is a penetration hole formed in the optical base and the low heat resistivity member is a heat dissipation member. According to the eleventh aspect of the invention, the penetration hole inhibiting heat transfer from the laser source and the heat dissipation member dissipating heat from the laser source work together to prevent distortion of the collimator lens.

According to the twelfth aspect of the invention, The optical pick-up apparatus according to the eleventh aspect, further comprising heat shielding means including a second high heat resistivity member mounted to the optical base and a space, wherein the laser source is disposed in the space, and the heat shielding means inhibits heat transfer between the optical base and the laser source. According to the twelfth aspect of the invention, the heat shielding means including the high heat resistivity member carrying the laser source, which is to be fixed to the optical base via the high heat resistivity member, and the space provided on the optical base and housing the laser source serves to inhibit heat transfer between the optical base and the laser source and thereby greatly reduce the thermal influence of the laser source on the collimator lens and prevent distortion of the collimator lens.

According to the other aspect of the invention, there is provided an optical disk apparatus constructed in accordance with the first aspect of the invention and comprising an optical pick-up apparatus having the ability to focus a laser beam emitted from a laser source to a beam spot on a recording medium, in which the beam spot is used to record information to and reproduce information from the medium. The other aspect of the invention provides an optical disk apparatus comprising a compact optical pick-up apparatus having the ability to reduce thermal distortion of a collimator lens on an optical base and including a number of laser sources.

According to the first aspect of the invention, flattening of the temperature gradient between the collimator lens and its surroundings makes it possible to provide an optical pick-up apparatus capable of allowing the collimator lens to have the minimum temperature gradient across the lens and dramatically reducing distortion of the collimator lens, and to provide an optical disk apparatus incorporating the optical pick-up apparatus.

DETAILED DESCRIPTION OF THE INVENTION

Figure 1:
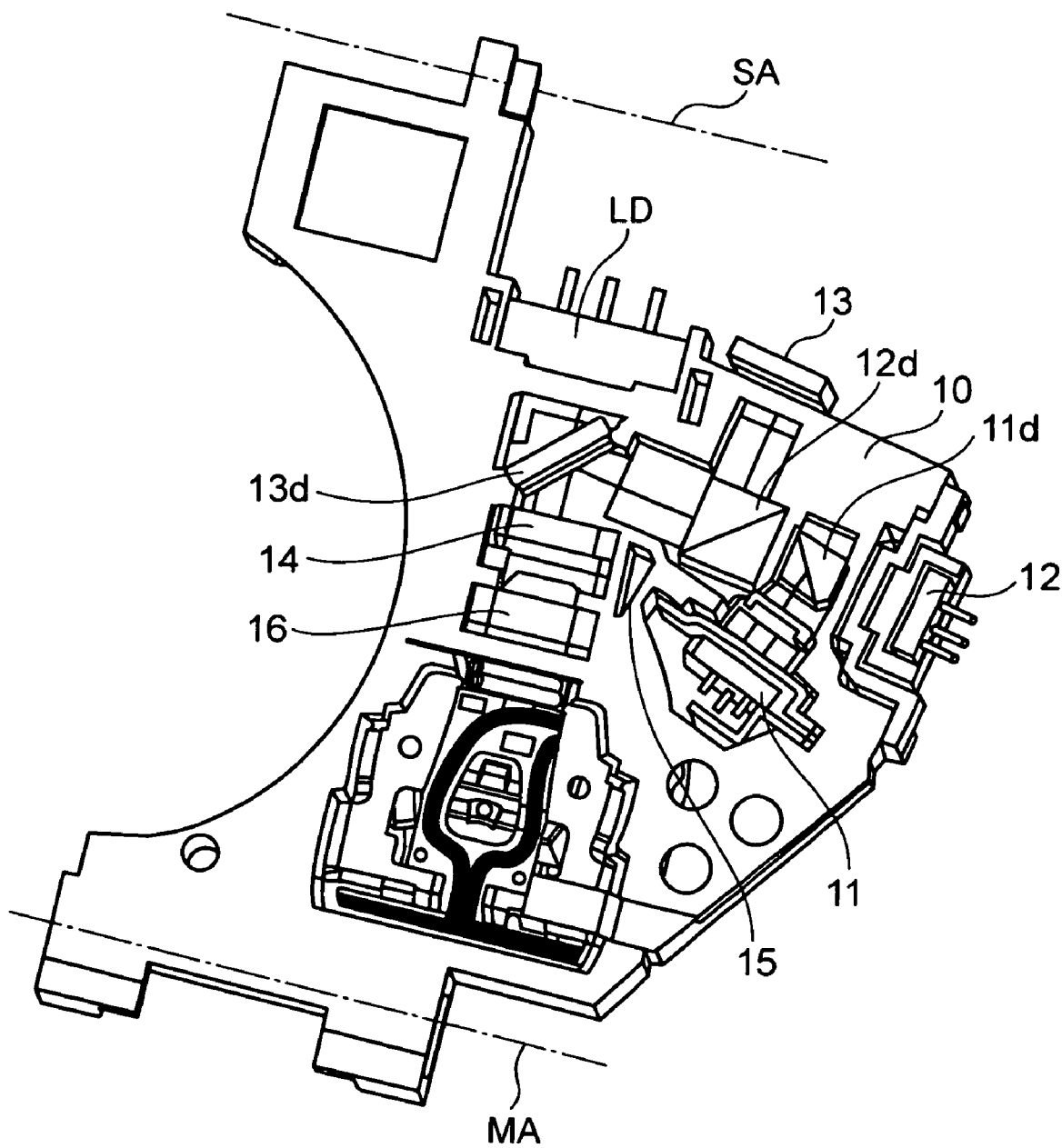
FIG. 1 is a perspective view showing the configuration of one embodiment of the invention.

Embodiments of the invention will be explained below with reference to the accompanying drawings. FIG. 1 shows the rear structure of an optical pick-up apparatus according to one embodiment of the invention.

In order for an optical disk apparatus to be compact, DVD laser source 11, HD-DVD laser source 12, and CD laser source LD are provided on an optical base 10 and an optical detector 13 is also provided close to those laser sources, as shown in FIG. 1. These laser sources 11, 12, LD are heat sources emitting laser beams that produce heat and the optical detector 13 is a heat source receiving a laser beam that produces heat. In particular, as described later, an optical axis is formed in the shape like letter "U" in a limited space available on the optical base 10 and the DVD laser source 11 and a collimator lens 14 are disposed adjacent and close to each other around opposite ends of the optical axis, in order to allow the optical pick-up apparatus to be compact. Further, when heat transferred from the laser source 11 to the collimator lens 14 causes a temperature gradient across the collimator lens 14 and results in distortion of the collimator lens, such distortion leads to a problematic situation where recording or reproduction of information on or from a recording medium is not normally performed.

In this embodiment, a penetration hole 15 is formed in a portion of the optical base 10 between the collimator lens 14 and the DVD laser source 11. The penetration hole 15 acts as a high heat resistivity member having high heat resistivity and is capable of substantially reducing the thermal influence of the laser source 11 on the collimator lens 14 and therefore is able to reduce the temperature difference between the collimator lens 14 and its surroundings, resulting in a strongly reduced temperature gradient therebetween. This prevents distortion of the collimator lens 14.

In the optical pick-up apparatus, a laser beam emitted from the laser source 11 is reflected by a first dichroic element 11d, passes through a polarization beam splitter 12d, is reflected by a second dichroic element 13d, passes through the collimator lens 14, is reflected by a launching mirror 16, transmits an objective lens (denoted by "OL" in FIG. 4), and is irradiated onto a disk.

Further, a laser beam emitted from the laser source 12 passes through the first dichroic element 11d, the polarization beam splitter 12d, is reflected by the second dichroic element 13d, passes through the collimator lens 14, is reflected by the launching mirror 16, transmits the objective lens OL, and is irradiated onto the disk.

Moreover, a laser beam emitted from the CD laser source LD passes through the second dichroic element 13d, passes through the collimator lens 14, is reflected by the launching mirror 16, transmits the objective lens OL, and is irradiated onto the disk.

Then, the respective laser beams emitted from the DVD, HDD-DVD, CD laser sources and irradiated onto the disk are reflected from the disk and the laser beams emitted from the DVD, HDD-DVD laser sources and reflected from the disk are received by the optical detector 13, and the laser beam emitted from the CD laser source is received by another optical detector (not shown).

As described above, the optical pick-up apparatus is configured so that a laser beam emitted from a laser source is focused to a beam spot on a disk and an optical detector receives the laser beam reflected from the disk in order to allow the apparatus to perform recording or reproduction of information on or from the disk, and the optical pick-up apparatus is incorporated in an optical disk apparatus.

Referring to FIG. 1, the motion of the optical pick-up apparatus is guided by a primary spindle MA driven directly by a drive source such as a motor and a secondary spindle SA provided parallel to the primary spindle MA.

In the above-described embodiment, the penetration hole 15 capable of substantially reducing the thermal influence of the DVD laser source 11 on the collimator lens 14 in order to flatten temperature gradient between the collimator lens 14 and its surroundings is provided. However, according to the invention, provision of a high heat resistivity member having high heat resistivity and including but not limited to the penetration hole inhibits heat transfer between the collimator lens 14 and the laser source 11, allowing temperature gradient between the collimator lens 14 and its surroundings to be flattened. According to the invention, flattening of the temperature gradient between the collimator lens 14 and its surroundings makes it possible to produce a uniform temperature profile across the collimator lens 14 itself and thus prevent distortion of the collimator lens 14.

Figure 2:
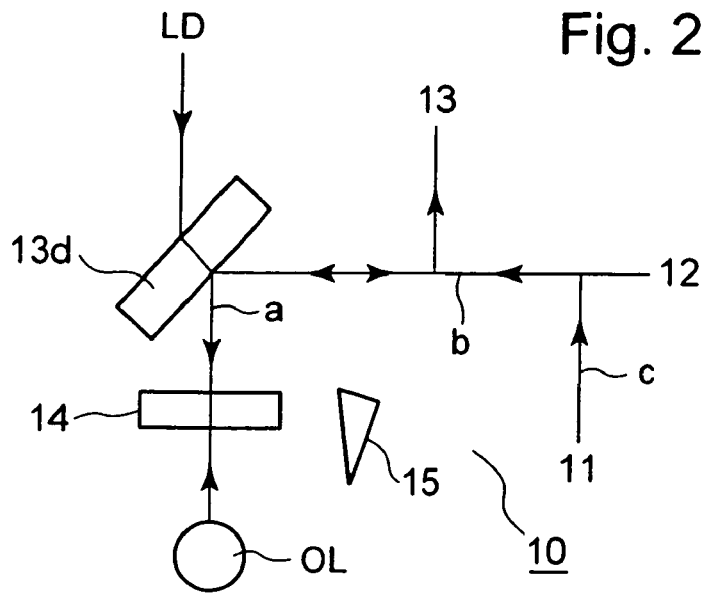
FIG. 2 is a diagram of a relationship between a collimator lens and a heat source in the configuration shown in FIG. 1.

FIG. 2 is a diagram of a relationship between these heat sources and the collimator lens 14. Laser beams emitted from the DVD laser source 11 and the HD-DVD laser source 12 are reflected by the second dichroic element 13d, passes through the collimator lens 14, and enters the objective lens OL. A laser beam emitted from the CD laser source LD transmits the second dichroic element 13d, passes through the collimator lens 14, transmits the objective lens OL, and enters the disk. The laser beam reflected from the disk transmits the objective lens OL, passes through the collimator lens 14, is reflected by the second dichroic element 13d, and enters the optical detector 13.

Further, as shown in FIGS. 1 and 2, in a limited space on the optical base 10, an optical axis "a" extending linearly in a direction from the side of the primary spindle MA to the side of the secondary spindle SA, an optical axis "b" intersecting the optical axis "a" and extending linearly in a direction toward the periphery of the optical base 10, and an optical axis "c" intersecting the optical axis "b" and extending linearly in a direction toward the side of the primary spindle MA form an optical axis having the shape like letter "U" and consisting of the axes "a", "b", and "c". In the vicinity of the end portions of the optical axes "a" and "c" on the side of the primary spindle MA, the DVD laser source 11 is arranged on the optical axis "c" toward the outer periphery of the optical base 10 and the collimator lens 14 is arranged on the optical axis "a" toward the inner periphery of the optical base 10, and consequently, the laser source 11 and the collimator lens 14 are located adjacent and close to each other, allowing the optical pick-up apparatus to be compact. Further, the penetration hole 15 is provided between the DVD laser source 11 and the collimator lens 14 on the optical base 10.

Figure 3A:
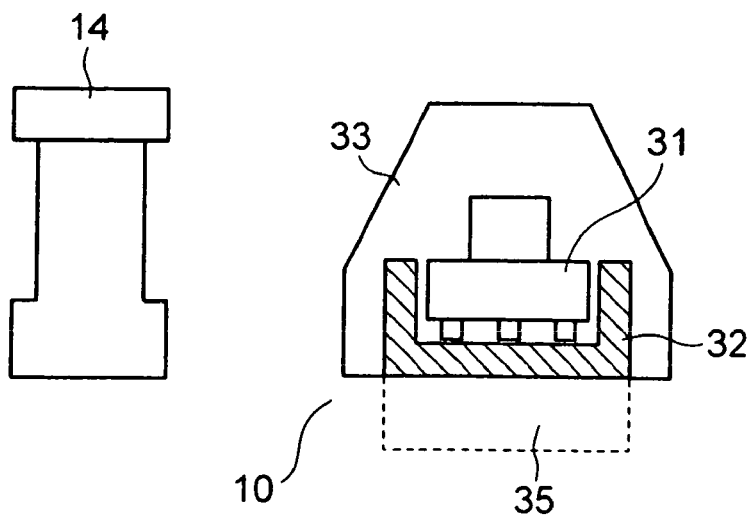
FIG. 3A is a diagram showing the configuration of another embodiment of the invention.
Figure 3B:
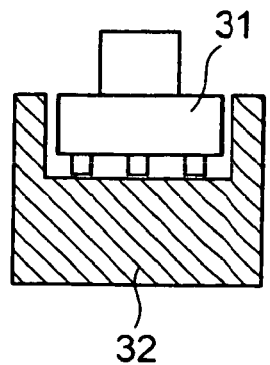
FIG. 3B is a diagram showing the configuration of another embodiment of the invention.

FIGS. 3A and 3B are diagrams showing another embodiment of the invention. As shown in FIG. 3B, a DVD laser source 31 is provided on an LD holder 32 made of a high heat resistivity material and supporting the laser source from the rear side of the base. Further, as shown in FIG. 3A, a portion 35 of the LD holder 32 is inserted into and fixed to the optical base 10 in a direction toward the rear side of the optical base 10 and a space 33 is provided on the front side of the optical base 10. This allows the LD holder 32 and the space 33 to inhibit heat transfer from the laser source 31, thereby preventing heat from the laser source 31 from reaching the collimator lens.

It should be appreciated that as indicated above, there are two methods for preventing heat transfer to the collimator lens 14. That is, the first method is conducted as described above to prevent the thermal influence of the laser sources 11, 31 on the collimator lens 14 and the second method is conducted to dissipate heat on the side of the laser source 11 to prevent the thermal influence of the laser source on the collimator lens 14.

Figure 4:
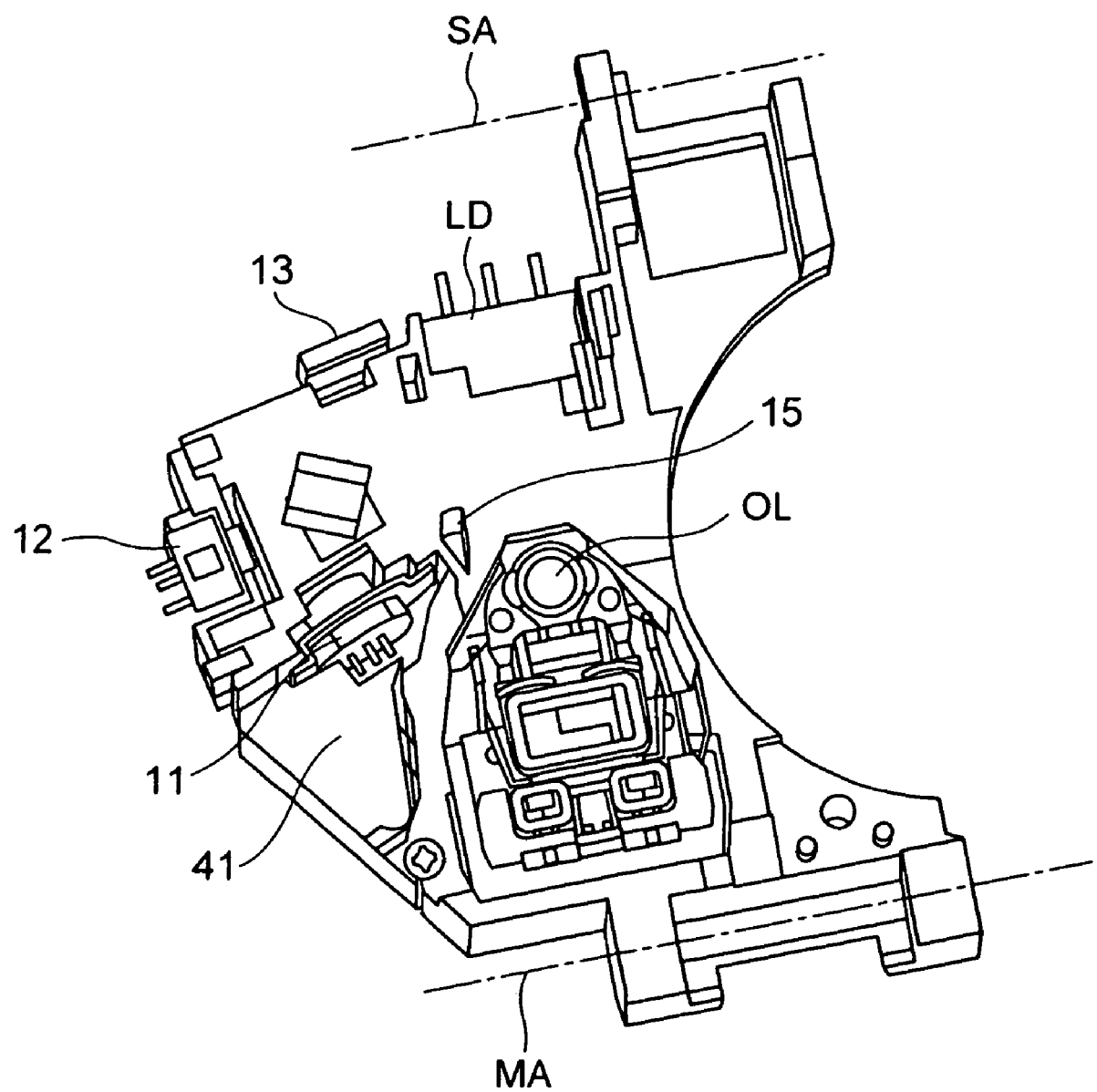
FIG. 4 is a perspective view showing the configuration of still another embodiment of the invention.

Still another embodiment of the invention for carrying out the second method is shown in FIG. 4. FIG. 4 is the outer appearance (i.e., the front side of the optical pick-up apparatus) when viewed from the rear side of the structure shown in FIG. 1 and in this embodiment, a low heat resistivity member such as a heat dissipation plate 41 is disposed opposite the collimator lens 14 with respect to the DVD laser source 11. Heat emitted from the DVD laser source 11 is allowed to escape through the heat dissipation plate 41, thereby reducing thermal influence on the collimator lens 14. If the heat dissipation plate 41 would be assembled prior to the attachment of the laser source to the base, it would be very difficult to accurately attach the laser source 11 to the optical base and therefore it is preferred that the plate is assembled after the laser source 11 is aligned and adjusted relative to the other components.

It is possible to combine the embodiments shown in FIG. 1 and the embodiment shown in FIG. 4. That is, while most of heat transfer from the DVD laser source 11 to the collimator lens 14 is thermally resisted by the high heat resistivity member such as the penetration hole 15, the high thermal conductive member such as the heat dissipation plate 41 is disposed opposite the collimator lens 14 with respect to the DVD laser source 11. This more effectively prevents the thermal influence of the laser source 11 on the collimator lens 14.

It should be appreciated that in the above embodiments, the DVD laser source 11 disposed as a heat source adjacent the collimator lens 14 on the optical base 10 has been illustrated, however, the heat source is not limited to the DVD laser source 11 and could be any type of member emitting light that produces heat or receiving light that produces heat.

The invention is applicable not only to an optical pick-up apparatus capable of detecting light beams of three wavelengths but to an optical pick-up apparatus capable of detecting light beams of two wavelengths and a general optical pick-up apparatus.

As described so far, the optical pick-up apparatus of the invention comprises the heat source disposed adjacent said collimator lens 14 on the optical base 10 and emitting light that produces heat or receiving light that produces heat, and temperature gradient control means 15, provided on the optical base 10, for flattening temperature gradient between said collimator lens 14 and its surroundings. Flattening of the temperature gradient between said collimator lens 14 and its surroundings results in the minimum temperature gradient across the collimator lens 14, leading to a significant reduction of distortion of the collimator lens. Moreover, defining an optical axis in a limited space on the optical base 10 so as to allow said collimator lens 14 and the heat source emitting light that produces heat or receiving light that produces heat to be disposed adjacent each other causes the optical pick-up apparatus and accordingly the optical disk apparatus to be compact.

The invention is not limited to the above embodiments and various modifications may be made without departing from the spirit and scope of the invention.

What is claimed is:

1. An optical pick-up apparatus comprising:
   an optical base;
   a collimator lens provided on the optical base at one end of an optical axis formed in a "u" shape by two reflecting elements;
   a laser source disposed adjacent to the collimator lens on the optical base and disposed at other end of the optical axis, the laser source producing heat by emitting light to the collimator lens; and
   a penetration hole forming a high heat resistor, formed between the collimator lens and the laser source in the optical base, for flattening temperature gradient between the collimator lens and its surroundings.

2. An optical pick-up apparatus comprising:
   an optical base;
   a collimator lens provided on the optical base at one end of an optical axis formed in a "u" shape by two reflecting elements;
   a laser source disposed adjacent to the collimator lens on the optical base and disposed at other end of the optical axis, the laser source producing heat by emitting light to the collimator lens; and
   a penetration hole forming a high heat resistor, provided between the collimator lens and the laser source on the optical base, for flattening temperature gradient between the collimator lens and its surroundings; and
   a heat dissipation plate forming a low heat resistor and dissipating heat, disposed opposite the collimator lens with respect to the laser source.

3. An optical pick-up apparatus comprising:
   an optical base;
   a collimator lens provided on the optical base at one end of an optical axis formed in a "u" shape by two reflecting elements;
   a laser source disposed adjacent to the collimator lens on the optical base and disposed at other end of the optical axis, the laser source producing heat by emitting light to the collimator lens; and
   a penetration hole forming a high heat resistor, provided between the collimator lens and the laser source on the optical base, for flattening temperature gradient between the collimator lens and its surroundings;
   a heat dissipation plate forming a low heat resistor and dissipating heat, disposed opposite the collimator lens with respect to the laser source; and
   a holder having a space as heat shielding means on a front side, the holder being mounted in the optical base.

* * * * *